United States Patent
Thiermann et al.

(10) Patent No.: US 6,206,126 B1
(45) Date of Patent: Mar. 27, 2001

(54) CARRIER FOR LIFTING DEVICES HAVING VARIABLE WIDTH TRACK

(75) Inventors: Daniel E. Thiermann, Grafton; Franklin J. Bankenbush, Sturtevant; Andrew M. Copp, Milwaukee, all of WI (US)

(73) Assignee: Thiermann Industries, Inc., Cedarburg, WI (US)

( * ) Notice: Subject to any disclaimer, the term of this patent is extended or adjusted under 35 U.S.C. 154(b) by 0 days.

(21) Appl. No.: 09/548,179

(22) Filed: Apr. 13, 2000

(51) Int. Cl.[7] .......................... B62K 13/00; B62D 61/12
(52) U.S. Cl. ........................ 180/209; 180/905; 280/638
(58) Field of Search .................... 180/9.48, 209, 180/905; 280/638

(56) References Cited

U.S. PATENT DOCUMENTS

| | | | |
|---|---|---|---|
| 3,712,398 | 1/1973 | Althaus | 180/9.48 |
| 3,754,361 | 8/1973 | Branham et al. | 52/115 |
| 4,350,222 * | 9/1982 | Lutteke et al. | 180/209 |
| 4,431,074 * | 2/1984 | Langerud | 180/9.48 |
| 5,039,129 * | 8/1991 | Balmer | 180/209 |
| 5,282,644 * | 2/1994 | Larson | 280/638 |
| 5,464,243 * | 11/1995 | Maiwald et al. | 280/638 |
| 5,489,114 | 2/1996 | Ward et al. | 280/638 |
| 6,145,610 * | 11/2000 | Gallignani | 180/9.48 |

* cited by examiner

Primary Examiner—Kenneth R. Rice
(74) Attorney, Agent, or Firm—Donald J. Ersler

(57) ABSTRACT

A carrier for lifting devices having a variable width track includes a base frame, a first wheel frame, a second wheel frame, at least four slide assemblies, at least two actuation devices, and at least four wheel assemblies. The first wheel frame is slidably attached to one side of the base frame with at least two of the slide assemblies. The second wheel frame is slidably attached to the other side of the base frame with at least two of the slide assemblies. At least one of the actuation devices moves the first wheel frame relative to the base frame. At least one of the actuation devices moves the second wheel frame relative to the base frame. At least two of the wheel assemblies are mounted to the first wheel frame and at least two of the wheel assemblies are mounted to the second wheel frame.

21 Claims, 7 Drawing Sheets

CARRIER FOR LIFTING DEVICES HAVING VARIABLE WIDTH TRACK

BACKGROUND OF THE INVENTION

1. Field of the Invention

The present invention relates generally to lifting devices and more specifically to a carrier for lifting devices having a variable width track which allows the track of the wheels to be changed while the carrier is transporting a load.

2. Discussion of the Prior Art

Many times it is advantageous for the width of a lifting device or the like to be as small as possible for entrance through gates and other narrow constraints. However, a lifting device with a narrow width is not appropriate for handling loads. Further, derricks and other lifting devices with variable tracks are nothing new. U.S. Pat. No. 3,754,361 to Branham, U.S. Pat. No. 3,712,398 to Althaus, and U.S. Pat. No. 5,489,114 to Ward all disclose devices having a variable track. The drawback to all these variable tracks is their inability to actuate while the carrier is moving. The carrier must be put on jacks, so that the wheels may be actuated inward or outward. The extra step of elevating the lifting device on jacks is time consuming and provides an extra opportunity for an accident to occur.

Accordingly, there is a clearly felt need in the art for a carrier for lifting devices having a variable width track which allows the track width to be changed while moving with the lifting device and when the carrier is transporting a load.

SUMMARY OF THE INVENTION

The present invention provides a carrier having a variable width track which may be actuated when the carrier is moving with or without a load.

A carrier for lifting devices having a variable width track includes a base frame, a first wheel frame, a second wheel frame, at least four slide assemblies, at least two actuation devices, and at least four wheel assemblies. The first wheel frame is slidably attached to one side of the base frame with at least two of the slide assemblies. The second wheel frame is slidably attached to the other side of the base frame with at least two of the slide assemblies. At least one of the actuation devices moves the first wheel frame relative to the base frame. At least one of the actuation devices moves the second wheel frame relative to the base frame. At least two of the wheel assemblies are mounted to the first wheel frame and at least two of the wheel assemblies are mounted to the second wheel frame.

Accordingly, it is an object of the present invention to provide a carrier for lifting devices or the like having a variable width track that may be actuated while the carrier is moving.

Finally, it is another object of the present invention to provide a carrier for lifting devices or the like having a variable width track that may be actuated when the carrier is carrying a load.

These and additional objects, advantages, features and benefits of the present invention will become apparent from the following specification.

DETAILED DESCRIPTION OF THE PREFERRED EMBODIMENTS

Figure 1:
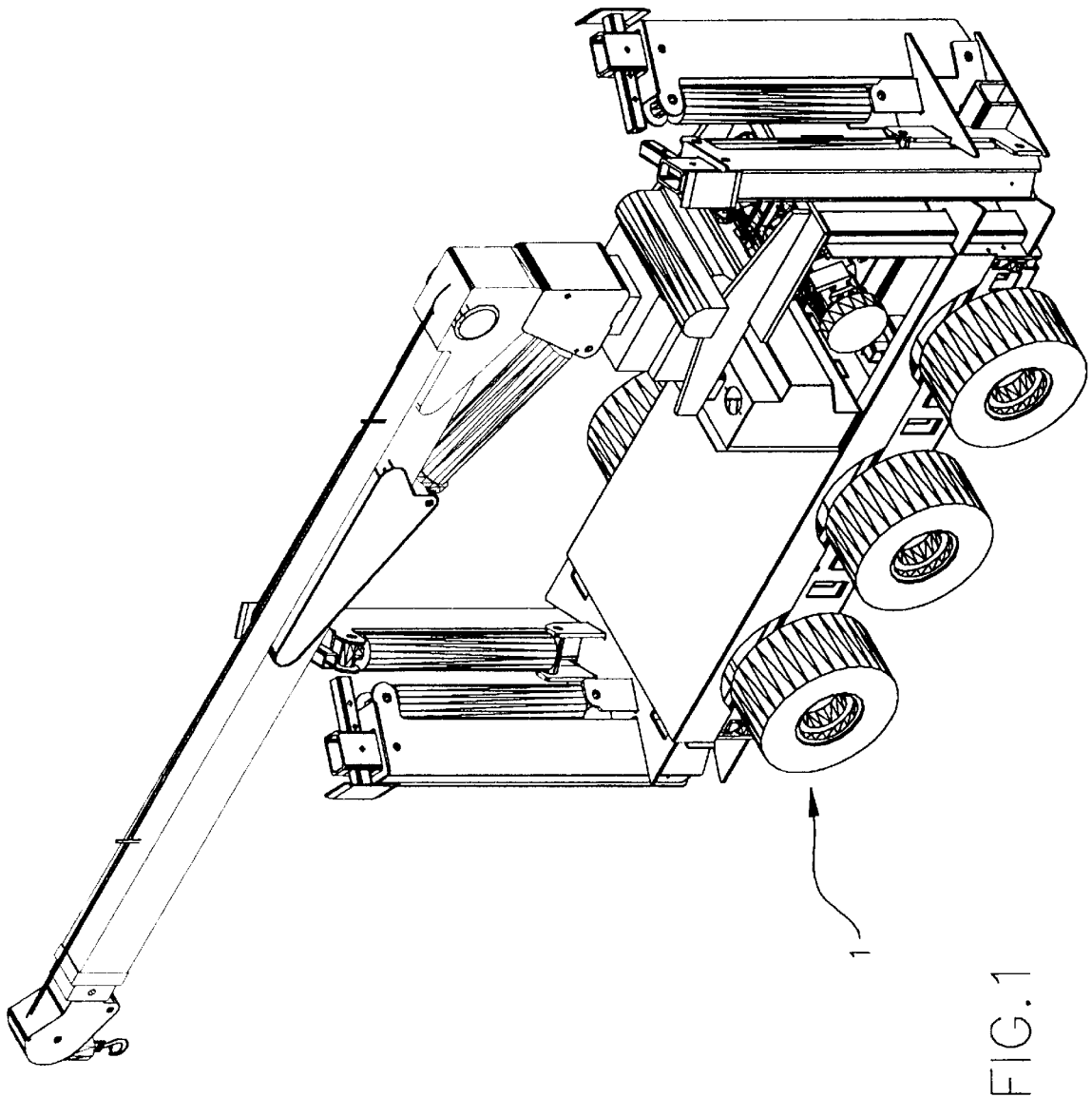
FIG. 1 is a perspective view of a derrick mounted on a carrier having a variable width track in accordance with the present invention.
Figure 2:
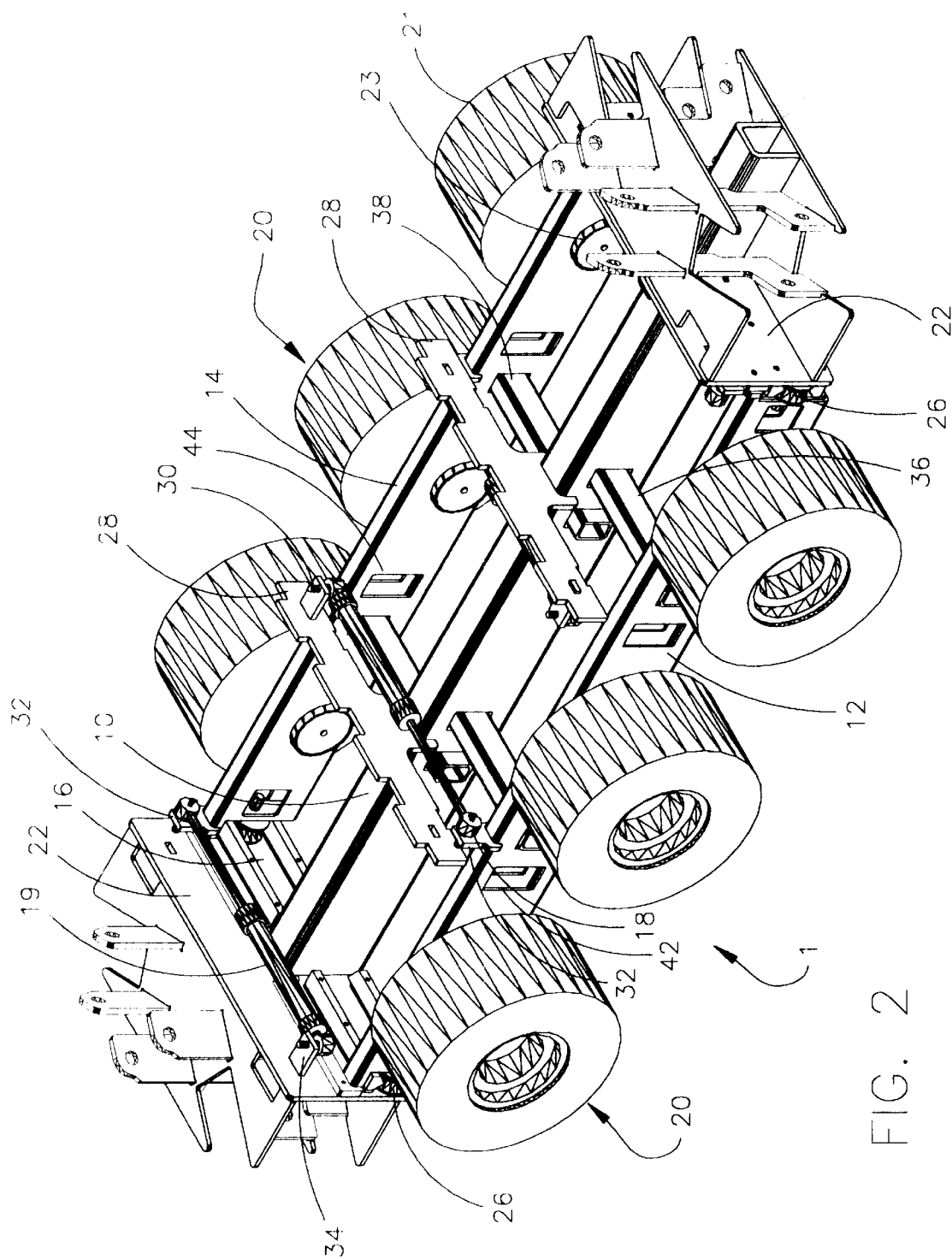
FIG. 2 is a perspective view of a carrier having a variable width track in accordance with the present invention.
Figure 5:
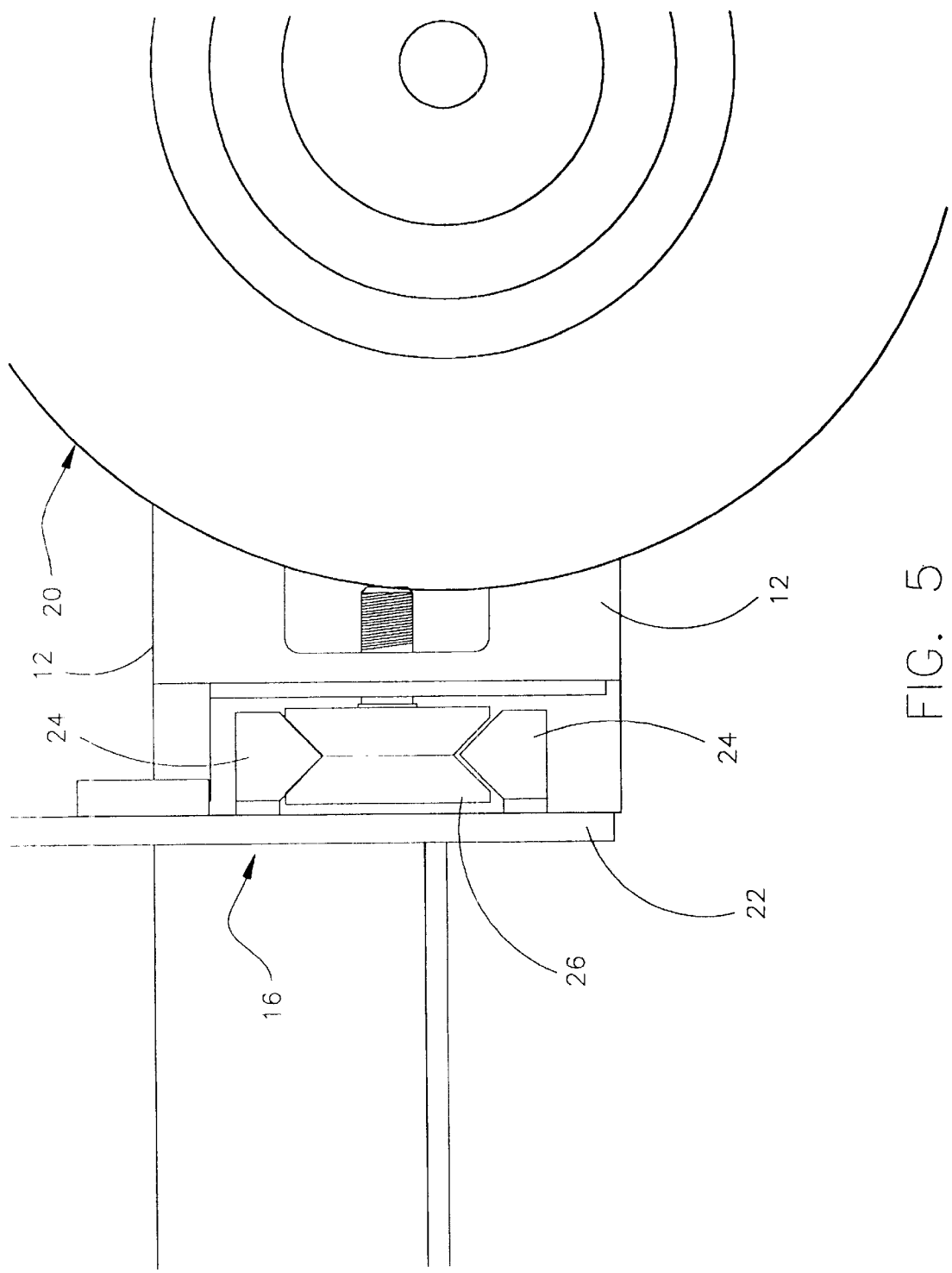
FIG. 5 is an enlarged end view of a slide assembly in accordance with the present invention.

With reference now to the drawings, and particularly to FIG. 1, there is shown a perspective view of a derrick mounted on a carrier having a variable width track 1. With reference to FIGS. 2–5, the carrier having a variable width track 1 includes a base frame 10, a first wheel frame 12, a second wheel frame 14, at least four slide assemblies 16, at least two actuation devices, and at least four wheel assemblies 20. A slide plate 22 is preferably attached to each end of the base frame 10. A pair of opposing slide bars 24 are preferably attached to the slide plate 22. With reference to FIG. 5, a slide roller 26 is slidably retained between each pair of slide bars 24. A single slide roller 26 is preferably mounted to each end of both the first and second wheel frames. The slide rollers 26 could also be disposed between the ends of either wheel frame. The slide roller 26 is a roller bearing which is preferably threaded into each end of the first and second wheel frames.

Figure 6:
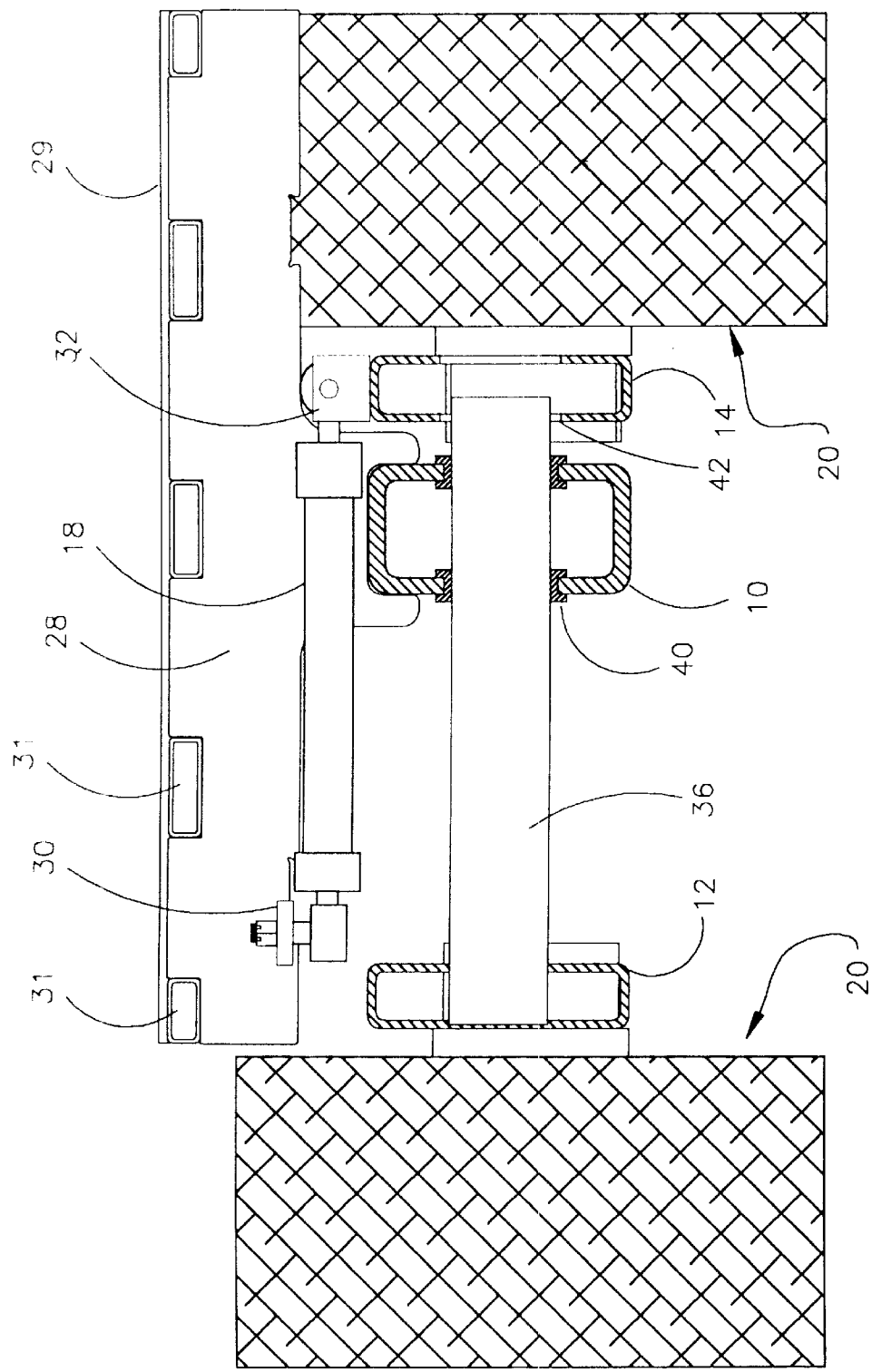
FIG. 6 is an enlarged cross-sectional view of a base having a variable width track in accordance with the present invention.

Preferably, at least two cross plates 28 are attached to the base frame 10. With reference to FIG. 6, a plurality of support rails 31 are attached to a top of the at least two cross plates 28 and a top of one of the slide plates 22. A cargo deck 29 is supported by one of the slide plates 22, cross plates 28, and plurality of support rails 31. The cargo deck 29 preferably supports a 3,000 pound load. At least one cross mounting plate 30 extends outward from each cross plate 28. At least one frame mounting plate 32 extends outward from each wheel frame. At least one slide mounting plate 34 extends outward from each slide plate 22. The actuation devices are preferably hydraulic cylinders, but could be any other suitable linear actuation device. One end of the cross actuation device 18 is pivotally mounted to the cross mounting plate 30 and the other end is pivotally mounted to the frame mounting plate 32. One end of the slide actuation device 19 is pivotally mounted to the frame mounting plate 32 and the other end is pivotally mounted to a slide mounting plate 34. The cross mounting plates 30 are preferably welded to their respective cross plates 28. The frame mounting plates 32 are preferably welded to their respective wheel frames. The slide mounting plates 34 are preferably welded to their respective slide plate 22.

At least one first stabilizer bar 36 extends inward from the first wheel frame 12. At least one second stabilizer bar 38 extends inward from the second wheel frame 14. With reference to FIG. 6, the first stabilizer bar 36 is preferably inserted through the first wheel frame 12 and welded thereto. The first stabilizer bar 36 is constrained from angular rotation by a plurality of slide bearings 40 attached to an inside of said base frame 10. Each slide bearing 40 is preferably fabricated from a nylon having a low coefficient of surface friction. A clearance opening 42 is formed in the second wheel frame 14 to provide clearance for a single stabilizer bar 36. The second stabilizer bar 38 is constrained in the base frame 10 as is the first stabilizer bar 36. A clearance opening 44 is formed in the first wheel frame 12 to provide clearance for each second stabilizer bar 38. Without the first and second stabilizer bars, the first and second wheel frames, respectively would rotate relative to their respective slide bars 24.

At least two wheel assemblies 20 are attached to the first wheel frame 12 and at least two wheel assemblies 20 are attached to the second wheel frame 14. Each wheel assembly 20 includes at least one wheel 21 and a hub 23. The hub 23 may be a pivotal connection to the wheel frame or a drive motor. It is preferably that all the hubs 23 be drive motors. The drive motor is preferably a hydraulic drive motor. The power source for a hydraulic drive motor is pressurized hydraulic fluid. The hydraulic fluid may be pressurized with an internal combustion engine and the appropriate hydraulic components. Other types of drive motors require other types of power sources to drive thereof. At least two hubs 23 are attached to the first wheel frame 12 and at least two hubs 23 are attached to the second wheel frame 14. At least one wheel 21 is attached to a single drive motor 23. It is possible to place a second wheel on the same hub 23 to form a double wheel. Steering of the carrier having a variable width track 1 may be accomplished by rotating the wheel assemblies 20 on one wheel frame at a faster speed than the wheel assemblies 20 on the other wheel frame. The carrier having a variable width track 1 may also be steered by rotating the wheel assemblies 20 on one wheel frame in the opposite direction of the wheel assemblies 20 on the other wheel frame.

Figure 3A:
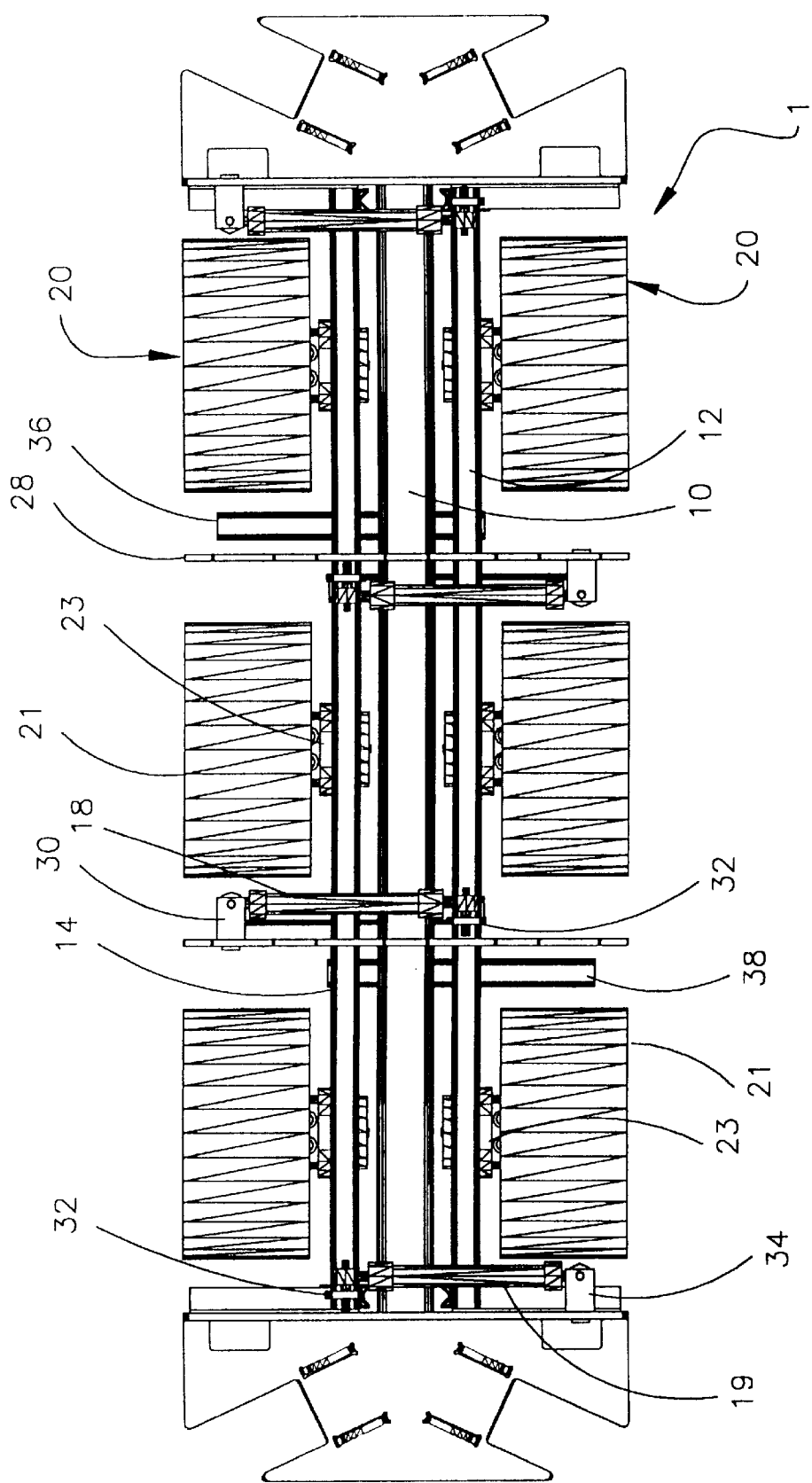
FIG. 3a is a top view of a carrier having a variable width track with both wheel frames in fully retracted positions in accordance with the present invention.
Figure 3B:
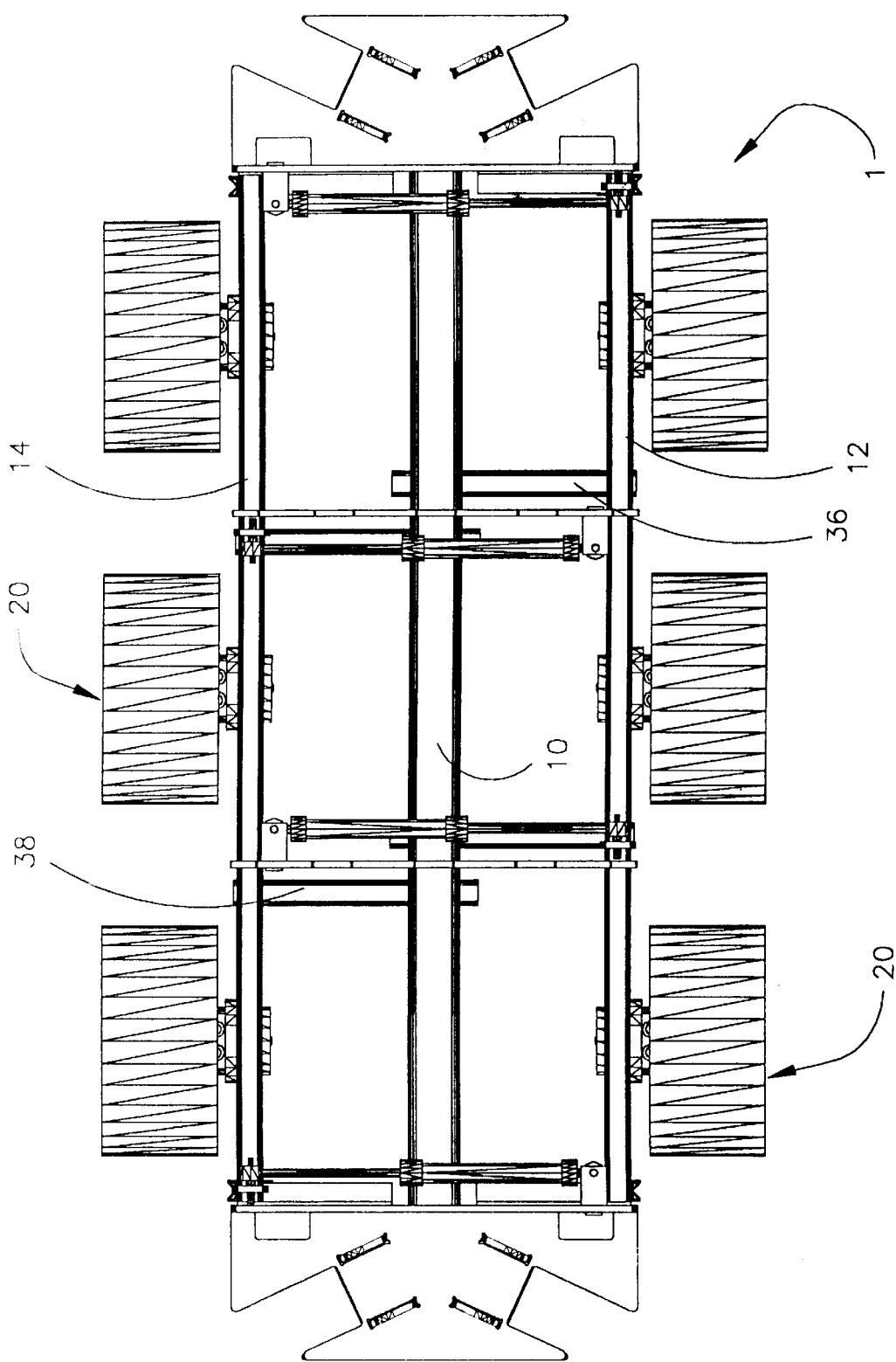
FIG. 3b is a top view of a carrier having a variable width track with both wheel frames in fully extended positions in accordance with the present invention.
Figure 4:
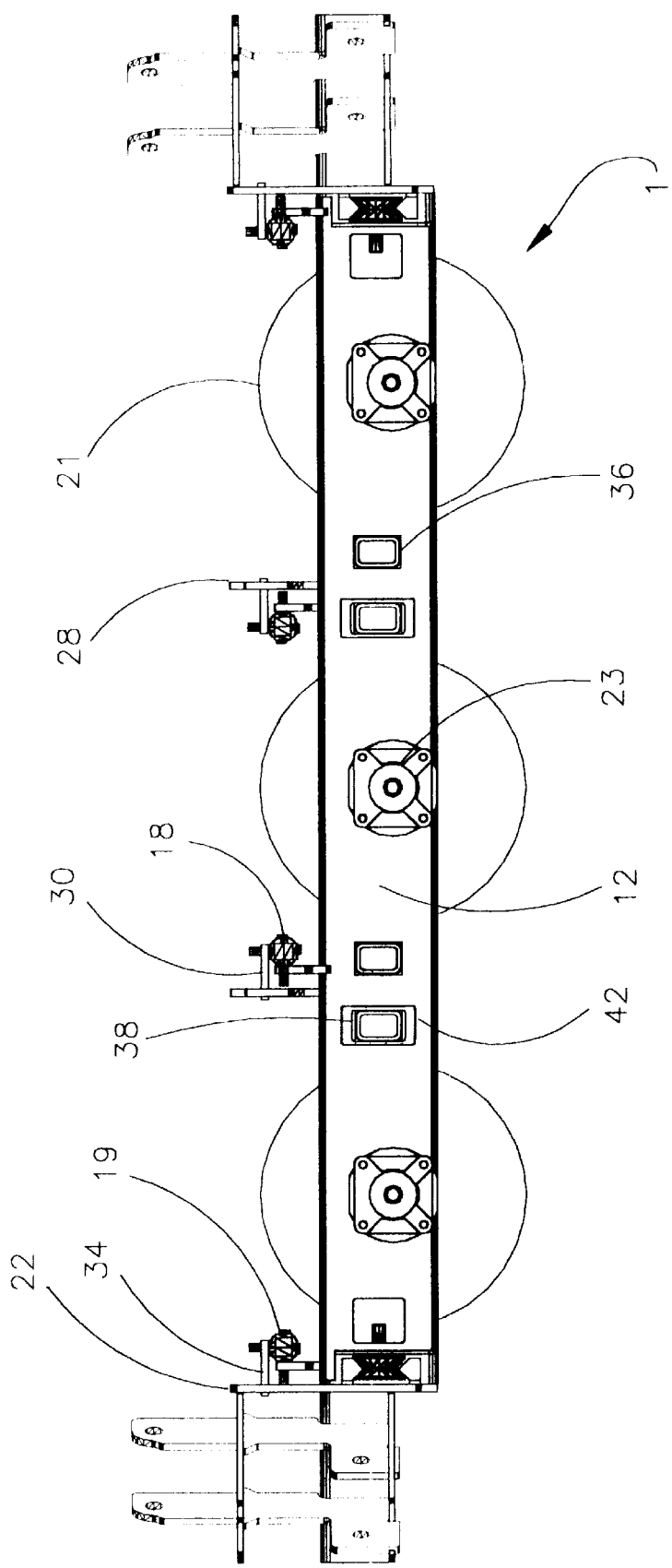
FIG. 4 is a side view of a carrier having a variable width track with the wheels not attached to the hubs on the first wheel frame in accordance with the present invention.

Either wheel frame may be actuated in and out independent of the other wheel frame. FIG. 6 shows the first wheel frame 12 extended, but the second wheel frame 14 retracted. FIG. 3a shows a carrier having a variable width track 1 with the first and second wheel frames retracted for minimum width. FIG. 3b shows a carrier having a variable width track 1 with the first and second wheel frames extended for maximum width. The movement of the first and second wheel frames is accomplished through the at least two actuation devices.

It is preferable that the rotation of each wheel assembly 20 and the movement of each actuation device be controlled by a remote control device.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A carrier having a variable width track for lifting devices or the like comprising:
   a base frame;
   a first wheel frame slidable engaged with said base frame;
   a second wheel frame slidably engaged with said base frame;
   at least one first actuation device providing movement of said first wheel frame relative to said base frame and at least one second actuation device providing movement of said second wheel frame relative to said base frame; and
   at least two wheel assemblies being mounted to said first wheel frame and at least two wheel assemblies being mounted to said second wheel frame.

2. The carrier having a variable width track for lifting devices or the like of claim 1, further comprising:
   at least two slide plates being attached to said base frame, two pairs of slide bars being attached to each said slide plate.

3. The carrier having a variable width track for lifting devices or the like of claim 2, further comprising:
   at least two slide rollers being attached to said first wheel frame, at least two slide rollers being attached to said second wheel frame, each said slide roller being constrained between a single said pair of slide bars.

4. The carrier having a variable width track for lifting devices or the like of claim 1, wherein:
   each said wheel assembly including at least one wheel and a hub, at least two said hubs being attached to each said wheel frame.

5. The carrier having a variable width track for lifting devices or the like of claim 4, wherein:
   said hub being a hydraulic motor drive.

6. The carrier having a variable width track for lifting devices or the like of claim 1, wherein:
   said at least one first actuation device being attached to said base frame and said first wheel frame, said at least one second actuation device being attached to said base frame and said second wheel frame.

7. The carrier having a variable width track for lifting devices or the like of claim 6, wherein:
   each said actuation device being a hydraulic cylinder.

8. The carrier having a variable width track for lifting devices or the like of claim 1, wherein:
   at least one first stabilizer bar extending from said first wheel assembly, at least one second stabilizer bar extending from said second wheel assembly, said stabilizer bars being slidably engaged with said base frame.

9. The carrier having a variable width track for lifting devices or the like of claim 1, wherein:
   actuation of said wheel frames occurring when said carrier is transporting a load.

10. The carrier having a variable width track for lifting devices or the like of claim 2, further comprising:
    at least two cross plates being attached to said base frame;
    a plurality of support rails being attached to said at least two cross plates, and one sliding plate; and
    a cargo deck being attached to said support rails.

11. A carrier having a variable width track for lifting devices or the like comprising:
    a base frame;
    a first wheel frame slidable engaged with said base frame;
    a second wheel frame slidably engaged with said base frame;
    at least one first stabilizer bar extending from said first wheel frame, at least one second stabilizer bar extending from said second wheel frame, said stabilizer bars being slidably engaged with said base frame;
    at least one first actuation device providing movement of said first wheel frame relative to said base frame and at least one second actuation device providing movement of said second wheel frame relative to said base frame; and
    at least two wheel assemblies being mounted to said first wheel frame and at least two wheel assemblies being mounted to said second wheel frame, wherein said wheel frames being actuatable when said carrier is in horizontal motion.

12. The carrier having a variable width track for lifting devices or the like of claim 11, further comprising:

at least two slide plates being attached to said base frame, two pairs of slide bars being attached to each said slide plate.

13. The carrier having a variable width track for lifting devices or the like of claim 12, further comprising:

at least two slide rollers being attached to said first wheel frame, at least two slide rollers being attached to said second wheel frame, each said slide roller being constrained between a single said pair of slide bars.

14. The carrier having a variable width track for lifting devices or the like of claim 11, wherein:

each said wheel assembly including at least one wheel and a hub, at least two said hubs being attached to each said wheel frame.

15. The carrier having a variable width track for lifting devices or the like of claim 14, wherein:

said hub being a hydraulic motor drive.

16. The carrier having a variable width track for lifting devices or the like of claim 11, wherein:

said at least one first actuation device being attached to said base frame and said first wheel frame, said at least one second actuation device being attached to said base frame and said second wheel frame.

17. The carrier having a variable width track for lifting devices or the like of claim 16, wherein:

each said actuation device being a hydraulic cylinder.

18. The carrier having a variable width track for lifting devices or the like of claim 11, wherein:

actuation of said wheel frames occurring when said carrier is carrying a load.

19. The carrier having a variable width track for lifting devices or the like of claim 12, further comprising:

at least two cross plates being attached to said base frame;

a plurality of support rails being attached to said at least two cross plates, and one sliding plate; and a cargo deck being attached to said support rails.

20. A method for providing a carrier with a track which may be varied in width while said carrier is horizontally in motion, comprising the steps of:

a) providing a base frame;

b) providing first and second wheel frames which are slidably engaged with said base frame, said first and second wheel frames opposing each other;

c) attaching at least two wheel assemblies to each said wheel frame, at least one wheel assembly being driven by a power source;

d) actuating said first wheel frame with at least one first actuation device while said carrier is in horizontal motion, actuating said second wheel frame with at least one second actuation device while said carrier is in horizontal motion.

21. A method for providing a carrier with a track which may be varied in width while said carrier is horizontally in motion of claim 20, wherein:

actuation of said wheel frames occurring when said carrier is carrying a load.

* * * * *